(12) United States Patent
Thompson

(10) Patent No.: US 9,825,943 B2
(45) Date of Patent: *Nov. 21, 2017

(54) LOCATION DETERMINATION FOR USER AUTHENTICATION

(71) Applicant: A10 Networks, Inc., San Jose, CA (US)

(72) Inventor: Micheal Thompson, Meridian, ID (US)

(73) Assignee: A10 NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,190

(22) Filed: Jul. 11, 2016

(65) Prior Publication Data

US 2016/0323261 A1   Nov. 3, 2016

Related U.S. Application Data

(63) Continuation of application No. 14/834,278, filed on Aug. 24, 2015, now Pat. No. 9,398,011, which is a (Continued)

(51) Int. Cl.
*H04L 29/06* (2006.01)
*G06F 21/00* (2013.01)
(Continued)

(52) U.S. Cl.
CPC ............ *H04L 63/083* (2013.01); *G06F 21/31* (2013.01); *H04L 63/08* (2013.01); (Continued)

(58) Field of Classification Search
CPC ...................................................... G06F 21/31
See application file for complete search history.

(56) References Cited

U.S. PATENT DOCUMENTS 5,541,994 A    7/1996  Tomko et al.
5,712,912 A    1/1998  Tomko et al.
(Continued)

FOREIGN PATENT DOCUMENTS

CN        1449618 A    10/2003
CN      101361037 A     2/2009
(Continued)

OTHER PUBLICATIONS

Eychenne, Herve, "WFLOGS," Dec. 15, 2002, URL: <http://web.archive.org/web/20021205151706/http://www.wallfire.org/wflogs/wflogs.8.html>, 7 pages.
(Continued)

*Primary Examiner* — Lisa Lewis
(74) *Attorney, Agent, or Firm* — AMPACC Law Group LLP; Keith Kline

(57) ABSTRACT

User authentication techniques based on geographical locations associated with a client device is provided. A network connection can be established between two or more host machines and a client device. Upon a request received from the client device by one of these host machines, round trip times of test messages may be measured between the client device and each of the host machines. The round trip times can be utilized to determine the current geographical location of the client device. If the location is within a tolerance geographical area, the client device may be authenticated. Otherwise, the authentication may fail or additional security procedures may be implemented. In some examples, a travel time from a historical geographical location to current geographical location can be determined. This data may be also utilized in the user authentication process.

14 Claims, 6 Drawing Sheets

Related U.S. Application Data continuation of application No. 13/925,745, filed on Jun. 24, 2013, now Pat. No. 9,122,853.

(51) Int. Cl.

| | | |
|---|---|---|
| *G06F 21/31* | (2013.01) | |
| *H04W 4/02* | (2009.01) | |
| *H04W 12/06* | (2009.01) | |
| *H04L 29/08* | (2006.01) | |

(52) U.S. Cl.
CPC ........ *H04L 63/0876* (2013.01); *H04L 63/102* (2013.01); *H04L 63/107* (2013.01); *H04L 67/02* (2013.01); *H04W 4/02* (2013.01); *H04W 12/06* (2013.01); *G06F 2221/2111* (2013.01); *H04L 63/108* (2013.01); *H04L 67/18* (2013.01); *H04L 2463/121* (2013.01)

(56) References Cited

U.S. PATENT DOCUMENTS

| | | | |
|---|---|---|---|
| 5,737,420 A | 4/1998 | Tomko et al. | |
| 5,757,916 A * | 5/1998 | MacDoran | G01S 19/215 342/357.48 |
| 5,832,091 A | 11/1998 | Tomko et al. | |
| 5,991,408 A | 11/1999 | Pearson et al. | |
| 6,035,398 A | 3/2000 | Bjorn | |
| 6,167,517 A | 12/2000 | Gilchrist et al. | |
| 6,182,146 B1 | 1/2001 | Graham-Cumming, Jr. | |
| 6,182,221 B1 | 1/2001 | Hsu et al. | |
| 6,219,793 B1 | 4/2001 | Li et al. | |
| 6,219,794 B1 | 4/2001 | Soutar et al. | |
| 6,310,966 B1 | 10/2001 | Dulude et al. | |
| 6,317,834 B1 | 11/2001 | Gennaro et al. | |
| 6,490,624 B1 | 12/2002 | Sampson et al. | |
| 6,507,912 B1 | 1/2003 | Matyas, Jr. et al. | |
| 6,714,931 B1 | 3/2004 | Papierniak et al. | |
| 6,748,084 B1 | 6/2004 | Gau et al. | |
| 6,901,145 B1 | 5/2005 | Bohannon et al. | |
| 6,950,651 B2 | 9/2005 | Seligmann | |
| 7,095,852 B2 | 8/2006 | Wack et al. | |
| 7,133,916 B2 | 11/2006 | Schunemann | |
| 7,155,514 B1 | 12/2006 | Milford | |
| 7,237,267 B2 | 6/2007 | Rayes et al. | |
| 7,360,237 B2 | 4/2008 | Engle et al. | |
| 7,376,969 B1 | 5/2008 | Njemanze et al. | |
| 7,480,934 B2 | 1/2009 | Chan et al. | |
| 7,484,089 B1 | 1/2009 | Kogen et al. | |
| 7,551,574 B1 * | 6/2009 | Peden, II | H04L 63/102 370/310 |
| 7,552,126 B2 | 6/2009 | Chen et al. | |
| 7,613,829 B2 | 11/2009 | Alve | |
| 7,647,635 B2 | 1/2010 | Chen et al. | |
| 7,716,378 B2 | 5/2010 | Chen et al. | |
| 7,804,956 B2 | 9/2010 | Chang et al. | |
| 7,979,585 B2 | 7/2011 | Chen et al. | |
| 8,104,091 B2 * | 1/2012 | Qin | G06F 21/10 726/26 |
| 8,122,152 B2 | 2/2012 | Chittenden et al. | |
| 8,151,322 B2 | 4/2012 | Chen et al. | |
| 8,423,676 B2 | 4/2013 | Chen et al. | |
| 8,595,383 B2 | 11/2013 | Chen et al. | |
| 8,782,751 B2 | 7/2014 | Chen et al. | |
| 8,868,765 B1 | 10/2014 | Chen et al. | |
| 8,903,986 B1 | 12/2014 | Newstadt et al. | |
| 9,060,003 B2 | 6/2015 | Wang et al. | |
| 9,076,027 B2 * | 7/2015 | Miura | G06K 9/00087 |
| 9,122,853 B2 | 9/2015 | Thompson | |
| 9,202,105 B1 | 12/2015 | Wang et al. | |
| 9,294,467 B2 | 3/2016 | Wang et al. | |
| 9,344,421 B1 | 5/2016 | Chen et al. | |
| 9,398,011 B2 | 7/2016 | Thompson | |
| 2001/0022558 A1 | 9/2001 | Karr, Jr. et al. | |
| 2002/0095587 A1 | 7/2002 | Doyle et al. | |
| 2003/0023874 A1 | 1/2003 | Prokupets et al. | |
| 2003/0101349 A1 | 5/2003 | Wang | |
| 2003/0105859 A1 | 6/2003 | Garnett et al. | |
| 2003/0140232 A1 | 7/2003 | De Lanauze | |
| 2003/0140235 A1 | 7/2003 | Immega et al. | |
| 2003/0142122 A1 | 7/2003 | Straut et al. | |
| 2003/0191989 A1 | 10/2003 | O'Sullivan | |
| 2003/0219121 A1 | 11/2003 | van Someren | |
| 2004/0015243 A1 * | 1/2004 | Mercredi | G07C 9/00158 700/17 |
| 2004/0034784 A1 | 2/2004 | Fedronic et al. | |
| 2004/0049687 A1 | 3/2004 | Orsini et al. | |
| 2004/0059924 A1 | 3/2004 | Soto et al. | |
| 2004/0081173 A1 | 4/2004 | Feather | |
| 2004/0153553 A1 | 8/2004 | Chotkowski et al. | |
| 2004/0167912 A1 | 8/2004 | Tsui et al. | |
| 2004/0194114 A1 | 9/2004 | Spiegel | |
| 2004/0224664 A1 | 11/2004 | Guo | |
| 2004/0254919 A1 | 12/2004 | Giuseppini | |
| 2004/0260651 A1 | 12/2004 | Chan et al. | |
| 2005/0009520 A1 | 1/2005 | Herrero et al. | |
| 2005/0010930 A1 | 1/2005 | Vaught | |
| 2005/0018618 A1 | 1/2005 | Mualem et al. | |
| 2005/0086502 A1 | 4/2005 | Rayes et al. | |
| 2005/0089048 A1 | 4/2005 | Chittenden et al. | |
| 2005/0108518 A1 | 5/2005 | Pandya | |
| 2005/0114186 A1 | 5/2005 | Heinrich | |
| 2005/0114321 A1 | 5/2005 | DeStefano et al. | |
| 2005/0137981 A1 | 6/2005 | Maes | |
| 2005/0144480 A1 | 6/2005 | Kim et al. | |
| 2005/0182969 A1 | 8/2005 | Ginter et al. | |
| 2005/0204162 A1 | 9/2005 | Rayes et al. | |
| 2005/0283609 A1 | 12/2005 | Langford | |
| 2006/0069687 A1 | 3/2006 | Cui et al. | |
| 2006/0077926 A1 | 4/2006 | Rune | |
| 2006/0083372 A1 | 4/2006 | Chang et al. | |
| 2006/0140452 A1 | 6/2006 | Raynor et al. | |
| 2006/0165226 A1 | 7/2006 | Ernst et al. | |
| 2006/0173977 A1 | 8/2006 | Ho et al. | |
| 2007/0011300 A1 | 1/2007 | Hollebeek et al. | |
| 2007/0032247 A1 | 2/2007 | Shaffer et al. | |
| 2007/0067441 A1 | 3/2007 | Pomerantz | |
| 2007/0067838 A1 | 3/2007 | Bajko | |
| 2007/0121560 A1 * | 5/2007 | Edge | H04W 64/00 370/338 |
| 2007/0179986 A1 | 8/2007 | Adam | |
| 2007/0180101 A1 | 8/2007 | Chen et al. | |
| 2007/0195791 A1 * | 8/2007 | Bosch | H04W 8/082 370/395.52 |
| 2007/0206746 A1 | 9/2007 | Andreasson et al. | |
| 2007/0271598 A1 | 11/2007 | Chen et al. | |
| 2007/0282855 A1 | 12/2007 | Chen et al. | |
| 2007/0283141 A1 | 12/2007 | Pollutro et al. | |
| 2007/0294209 A1 | 12/2007 | Strub et al. | |
| 2008/0002684 A1 | 1/2008 | Kumazawa et al. | |
| 2008/0080398 A1 | 4/2008 | Yasuie et al. | |
| 2008/0104276 A1 | 5/2008 | Lahoti et al. | |
| 2008/0109887 A1 | 5/2008 | Chen et al. | |
| 2008/0130898 A1 | 6/2008 | Holtmanns et al. | |
| 2008/0148357 A1 | 6/2008 | Chen et al. | |
| 2008/0263626 A1 | 10/2008 | Bainter et al. | |
| 2009/0047952 A1 | 2/2009 | Giaretta et al. | |
| 2009/0213763 A1 | 8/2009 | Dunsmore et al. | |
| 2009/0292924 A1 | 11/2009 | Johnson et al. | |
| 2009/0299862 A1 | 12/2009 | Fan et al. | |
| 2010/0153544 A1 | 6/2010 | Krassner et al. | |
| 2010/0159955 A1 * | 6/2010 | Aerrabotu | G06F 17/3087 455/456.3 |
| 2010/0217819 A1 | 8/2010 | Chen et al. | |
| 2011/0055913 A1 | 3/2011 | Wong | |
| 2011/0239289 A1 | 9/2011 | Wang et al. | |
| 2012/0084133 A1 | 4/2012 | Ross et al. | |
| 2012/0204236 A1 | 8/2012 | Chen et al. | |
| 2012/0216266 A1 | 8/2012 | Wang et al. | |
| 2012/0246737 A1 | 9/2012 | Paxton et al. | |
| 2013/0036342 A1 | 2/2013 | Deo et al. | |
| 2014/0059702 A1 | 2/2014 | Wang et al. | |
| 2014/0143149 A1 * | 5/2014 | Aissi | G06F 21/31 705/44 |
| 2014/0229268 A1 | 8/2014 | Clapp et al. | |

(56) References Cited

U.S. PATENT DOCUMENTS

| | | |
|---|---|---|
| 2014/0347479 A1 | 11/2014 | Givon |
| 2014/0380424 A1 | 12/2014 | Thompson |
| 2015/0012746 A1 | 1/2015 | Kulkarni et al. |
| 2015/0141076 A1* | 5/2015 | Libin .................. H04W 4/003 455/557 |
| 2015/0312237 A1 | 10/2015 | Wang et al. |
| 2015/0365410 A1 | 12/2015 | Thompson |
| 2016/0182456 A1 | 6/2016 | Wang et al. |

FOREIGN PATENT DOCUMENTS

| | | |
|---|---|---|
| CN | 101375253 A | 2/2009 |
| CN | 102098316 A | 6/2011 |
| CN | 102098316 B | 6/2011 |
| CN | 101361037 B | 7/2011 |
| CN | 102123156 A | 7/2011 |
| CN | 101375253 B | 9/2011 |
| CN | 102123156 B | 9/2015 |
| TW | 526643 B | 4/2003 |
| TW | I249314 B | 2/2006 |
| WO | WO0221788 A2 | 3/2002 |
| WO | WO2008067013 A2 | 6/2008 |
| WO | WO2008070248 A2 | 6/2008 |
| WO | WO2014209660 A1 | 12/2014 |

OTHER PUBLICATIONS

Microsoft Corporation, "To Filter events in an event log," Jul. 2, 2004, URL: <http://web.archive.org/web/20040702070538/http://www.microsoft.com/resources/documentation/windows/xp/all/proddocs/en-us/nt_filteringevents_how_ev.mspx>, 2 pages.

The Cable Guy, "Configuring the Routing and Remote Access Service in Windows 2000," Microsoft TechNet, Jul. 22, 2004, URL: <http://web.archive.org/web/20040722111534/http://www.microsoft.com/technet/community/columns/cableguy/cg0601.mspx>, 5 pages.

Monrose et al., "Cryptographic Key Generation from Voice," Proceedings of the 2001 IEEE Symposium on Security and Privacy, pp. 202-213, May 2001.

Shamir, "How to share a secret," Communications of the ACM, vol. 22, No. 11, pp. 612-613, Nov. 1979.

Jermyn et al., "The Design and Analysis of Graphical Passwords," 8th USENIX Security Symposium ; Aug. 1999; 15 pp.

Soutar et al., "Biometric Encryption™," Bioscrypt Inc., 1999, pp. 1-28.

Duda et al., "Pattern Classification," Second Edition; 2001; pp. 117-121.

Zhang et al.; "Personal Authentication Based on Generalized Symmetric Max Minimal Distance in Subspace;" 2003; IEEE; pp. 245-248.

Okada et al.; "An Optimal Orthonormal System for Discriminant Analysis"; 1985; Pattern Recognition, vol. 18, No. 2; pp. 139-144.

Chang et al.; "Biometrics-Based Cryptographic Key Generation;" in Multimedia and Expo, Jun. 2004. ICME'04. 2004 IEEE International Conference on (vol. 3, pp. 2203-2206). IEEE.

Zhang et al.; "Optimal Thresholding for Key Generation Based on Biometrics;" in Image Processing, Oct. 2004. ICIP'04. 2004 International Conference on (vol. 5, pp. 3451-3454). IEEE.

Marandon, Alex, "How to Build a Web Widget (Using jQuery)," Jun. 2010, URL: <https://web.archive.org/web/20100623004301/http://alexmarandon.com/articles/web_widget_jquery/>, 7 pages.

* cited by examiner

LOCATION DETERMINATION FOR USER AUTHENTICATION

CROSS-REFERENCE TO RELATED APPLICATIONS

The present application is a continuation and claims the priority benefit of U.S. patent application Ser. No. 14/834,278 filed on Aug. 24, 2015 and entitled "Location Determination for User Authentication", now U.S. Pat. No. 9,398,011 issued on Jul. 19, 2016, which in turn is a continuation and claims the priority benefit of U.S. patent application Ser. No. 13/925,745 filed on Jun. 24, 2013 and entitled "Location Determination for User Authentication", now U.S. Pat. No. 9,122,853 issued on Sep. 1, 2015. The disclosures of the above-referenced patent applications are incorporated herein by reference in their entirety for all purposes.

TECHNICAL FIELD

This disclosure relates generally to computer and network security and, more particularly, user authentication based on geographical location of client devices accessing network services or data resources.

DESCRIPTION OF RELATED ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Today, wireless communication network technologies allow portable computing devices, such as mobile phones or tablet computers, to access network resources and various services from any location wherever a suitable communications network can be found. It is very common nowadays for users to travel with their portable computing devices within a city of their residence, other cities, states, or even other countries.

The security of data stored on the portable computing devices is important to many users. Many users may store credentials (i.e., logins and passwords) for access to various sensitive network resources and online services on their portable computing devices, for example, in the form of auto-login scripts or auto-fill scripts. Additionally, Internet browsers may store user credentials to make it easy for the users to visit certain websites. However, user credentials may be stolen by someone who seeks and exploits weaknesses in a computer system or computer network. Alternatively, a portable computing device can be stolen to get access to certain network resources and services using the stolen portable computing device. In either case, unlawful use of the user accounts or data can result, which is a common form of identity theft. Accordingly, there is always need for improved user authentication.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure approaches provide for user authentication based on determination of a current geographical location of client device. More specifically, according to one approach of the present disclosure, there are provided two or more host machines, which geographical locations are known or predetermined. A client device, such as a mobile phone or portable computing device may establish a network connection using any connection-oriented network protocol, for example, a Transmission Control Protocol (TCP), with these two or more host machines. Upon a request received from the client device by one of these host machines, test messages can be exchanged between the client device and each of the host machines so that round trip times (RTTs) of these test messages can be measured. Furthermore, based at least in part on the measured RTTs, distances between the client device and each of the host machines can be calculated. Additionally, angles of a triangle with corners corresponding to geographical locations of the client device and two host machines can be calculated. Based on the distances and, optionally, the angles, a geographical location of the client device may be determined along with associated metadata. The associated metadata may include, for example, a geographical name (e.g., a state and city), a zip or postal code, and geographical coordinates (e.g., a latitude and longitude values). The current geographical location can be then evaluated against a tolerance geographical area which may relate to device historical locations. If it is determined that the client device is located within the tolerance geographical area, the client device may be authenticated. Additionally, the authentication process may involve additional steps of verifying user credentials or requiring user to provide personal information to confirm the identity. Alternatively, when it is determined that the client device is not located with the tolerance geographical area, the client device cannot be authenticated, and access is denied.

According to various embodiments, the tolerance geographical area may be based on historical location data, which may include geo-identifiers of places where the client device may have been previously located. In this regard, if it is known that a user commonly uses his device from home and typically does not travel outside his city of residence, an attempt to access network resources associated with the user or the client device itself from other than mentioned location, would be considered a potential security issue. In this case, the user may need to provide user credentials or additional layers of security such as sending a one-time (OTP) password, asking additional security questions, and so forth, can be implemented. In certain embodiments, the tolerance geographical area may be dynamically updated every time the client device is authenticated. It should be understood that tolerance geographical areas are not limited to triangles, and, in various embodiments, may have any suitable topology or shape. Furthermore, the tolerance geographical area may have a margin of error extended to account for false or erroneous location determination.

According to another embodiment, a time-based mechanism to perform user authentication can be utilized. More specifically, a current geographical location of the client device can be determined and in response to a user authentication request, compared to a previous geographical location of the client device in association with a corresponding a timestamp. Furthermore, a trip time from the previous geographical location to the current geographical location based on a current time and the timestamp retrieved can be estimated. If it is determined that the trip time is reasonable, the client device may be authenticated. Otherwise, e.g., when the estimated trip time is too short for the device to possibly travel between the two locations, the client device may not be authenticated.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure refer to user authentication in any connection-oriented networks based on a current geographical location of a client device. The client device in possession of a user may relate to a wide range of electronic devices having ability to establish a network connection. Some examples of client devices may include a computer (desktop computer, laptop computer, tablet computer, portable computing device such as a personal digital assistant), a cellular phone (e.g., a smart phone), game console, in-vehicle computer system, and so forth. The geographical location of the client device may be determined based on measurements performed by host machines as described in greater detail below. The term "host machine," as used herein, may refer to any suitable network node or a computing device coupled to a computer network. The host machine may perform a number of various functions such as store data or provide access to multiple information resources, services, and applications.

Figure 1:
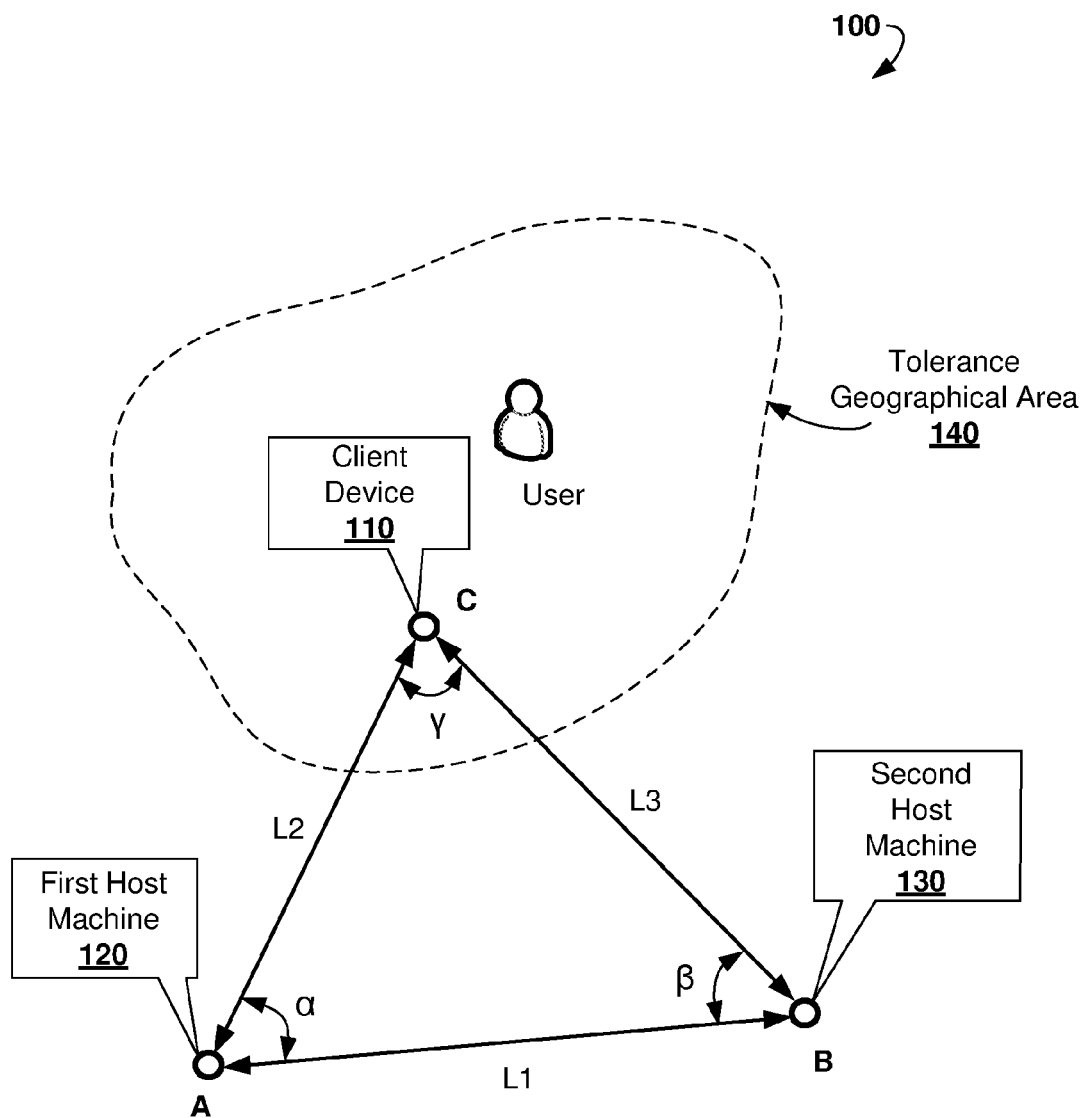
FIG. 1 shows a high level block diagram of a system environment suitable for implementing various embodiments of the present disclosure.

FIG. 1 shows a high level block diagram of a system environment 100 suitable for implementing various embodiments of the present disclosure. As shown in the figure, there are a client device 110 and two host machines: a first host machine 120 and a second host machine 130. The client device 110 may establish an IP network connection with each of the host machines 120, 130.

Each of the devices 110-130 is associated with specific geographical locations denoted in the figure as A, B, and C, accordingly. The geographical locations A and B pertaining to the host machines 120, 130 may be predetermined or known. Accordingly, a distance L1 between the first host machine 120 and the second host machine 130 may be also known or predetermined. The location C of the client device 110 is unknown prior to an authentication process as described herein.

When a user of client device 110 wants to access specific network resources or services provided by one of the host machines 120, 130 or any other host machine (not shown), the client device 110 generates an authentication request and sends it, for example, to the first host machine 120. In response, the first host machine 120 or any other networked device initiates the authentication process. In particular, there may be generated test messages and exchanged between the first host machine 120 and the client device 110. Similarly, another test message may be exchanged between the second host machine 130 and the client device 110. The test messages can be used to measure a first round trip time (RTT) with respect the client device 110 and the first host machine 120, and a second RTT with respect the client device 110 and the second host machine 130. Based on the measured first and second RTTs, a distance L2 between the client device 110 and the first host machine 120 and a distance L3 between the client device 110 and the second host machine 130 can be calculated. Furthermore, based on at least the known distances L1, L2 and L3, the location C of the client device 110 may be determined.

In certain embodiments, there may be also calculated angles of a triangle with corners correlating to the location A, B and C. These angles are shown in the FIG. 1 as α, β and γ. The calculation of these angles may be performed by utilizing, for example, a low of cosines. In general, the angles of the triangle may facilitate determining the geographical location C of the client device 110. It should be also clear that although only the operations involving two host machines 120, 130 are shown and described, the number of host machines performing RTT measurements may be more than two. In certain circumstances, a greater number of the host machines may increase accuracy of determination of the location C. For example, knowing distances from three host machines to the client device 110 may unambiguously determine an absolute location C of the client device 110.

In certain embodiments, "RTT smoothing" technique can be implemented. Specifically, the RTTs may be measured multiple times between each of mentioned directions. Furthermore, average values of the RTTs in each direction can be calculated. As will be appreciated by those skilled in the art, this process may enhance the quality of the distance calculation.

It should be also noted that the geographical location C of the client device 110 may include merely a geo-identifier. In an example, the geo-identifier may relate to a geographical name (e.g., a state and city, or state, city and district title, or state, city and street address). In another example, the geo-identifier may relate to a zip or postal code. In yet another example, the geo-identifier may relate absolute coordinates including latitude and longitude. Geo information can be obtained from third party databases which provide such information based on various network characteristics.

According to various embodiments, when the geographical location C is determined, it may be evaluated to see if it is within a "trusted area"—a tolerance geographical area 140. The tolerance geographical area 140 may be, for example, predetermined or fixed to certain place(s). In another example, the tolerance geographical area 140 may be based on locations where the client device 110 has been successfully authenticated in the past. Accordingly, in certain embodiments, the tolerance geographical area 140 may be dynamically updated each time the client device 110 is successfully authenticated. Furthermore, the tolerance geographical area 140 may have any suitable topology or shape such as, for example, a circle, triangle, square, an outline of a city or district, and so forth. In certain embodiments, the tolerance geographical area 140 may be artificially extended, especially in case when initial square of the tolerance geographical area 140, is relatively small so as to reduce a number of false or erroneous location determination or the user authentication. In either case, it should be understood that if the client device 110 is within the tolerance geographical area 140, the client device 110 may be authenticated. Otherwise, the client device 110 either is not authenticated or additional security challenges can be introduced.

Figure 2:
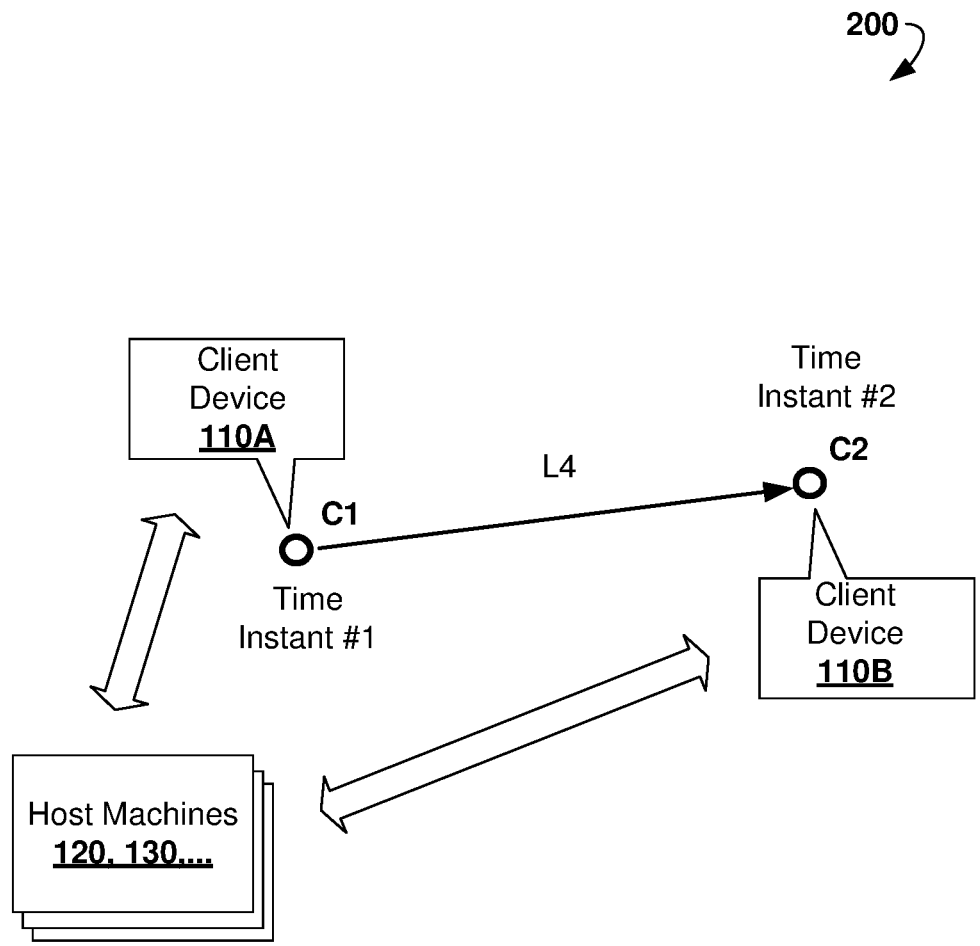
FIG. 2 shows a high level block diagram of another system environment suitable for implementing various embodiments of the present disclosure.

FIG. 2 shows a high level block diagram of a system environment 200 suitable for implementing various embodiments of the present disclosure. In particular, the system environment 200 illustrates another approach to perform user authentication. The geographical location of the client device 110 may be determined multiple times by two or more host machines 120, 130 over a period of time. For example, at a first time, the location C1 of the client device 110A can be determined. At a second time, a request to access network resources associated with the user of the client device 110A can be received from a client device 110B. The client device 110B may be the same as the client device 110A or a different client device. In either case, the plurality of host machines 120, 130 may implement the above described process to determine a geographical location C2 of the client device 110E at the second time. Furthermore, a distance L4 between the previously determined location C1 (when the client device 110 has been successfully authenticated) and the new location C2 may be calculated. Then, a trip time for the client device 110A to travel from the location C1 to the location C2 can be evaluated. If the estimated time travel is about the same or less than a difference between the first and second times, it may be assumed that the client device 110B is the same device as the client device 110A, and, therefore, successfully authenticated. Otherwise, when the estimated time travel is longer than the difference between the first and second time instances, it is assumed that the user credentials are not authentic as a result of a malicious attempt to access user's network resources or services. In the latter case, authentication of the client device 110E fails or additional security challenges may be introduced.

According to an example, a user is located in Atlanta, Ga. He is the valid owner of the credentials that have been provided to one of the host machines 120, 130 for authentication. These credentials and geo-location identifier related to C1 along with a corresponding timestamp can be stored. Two hours later the same user credentials are presented from Moscow, Russia. The current time is evaluated against the last time the user has been authenticated with the credentials. This attempted authentication would be met with an adaptive authentication challenge or the authentication attempt would be rejected. The escalation or rejection of the authentication would occur because an average direct flight time between Atlanta and Moscow is about 10 hours which is much greater than the two hours since the last time the user has been authenticated. It would not be possible for someone to travel from Atlanta to Moscow within 2 hours.

In yet another approach, every time the client device 110 attempts authentication, HTTP (Hypertext Transfer Protocol) cookies may be acquired from a browser associated with the client device 110. The HTTP cookies may include metadata associated with one or more previous geographical locations (i.e., trusted historical data) where the client device 110 has already been successfully authenticated.

In some example embodiments, the metadata can also include a geo-location based on a network and/or mobile addresses such as Internet Protocol version 4 (IPv4) and Internet Protocol version 6 (IPv6) addresses.

The HTTP cookies may be analyzed, and in case they indicate that the client device 110 is within a predetermined distance from the previous geographical location, the client device 110 may be authenticated at this time. Otherwise, when the HTTP cookies are absent or contain misleading metadata, additional security challenges can be provided.

It should be clear that even when the client device 110 is successfully authenticated, the user may still be required to provide credentials for verification. Some examples of user credentials may include a login name, a password, a personal identification code, an email address, an answer to a security question, a one-time password (OTP), and so forth. Accordingly, in an example, if the client device 110 is authenticated based on principles disclosed herein, user login and password can be verified. Otherwise, if the client device 110 is not successfully authenticated, in addition to verifying the user login and password, an answer to a security question may be requested.

Figure 3A:
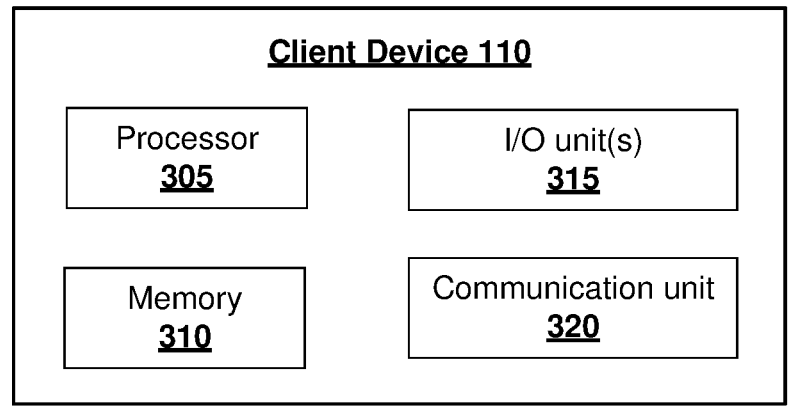
FIG. 3A shows a high level block diagram of an exemplary client device.

FIG. 3A shows a high level block diagram of an exemplary client device 110. The client device 110 may comprise a processor 305 and associated memory 310 which may store instructions and code implementable by the processor 305. Furthermore, the client device 110 may include one or more I/O units 315 (e.g., a touchscreen, keypad, display, etc.) and a communication unit 320 for sending and receiving data (e.g., via a wireless network).

Figure 3B:
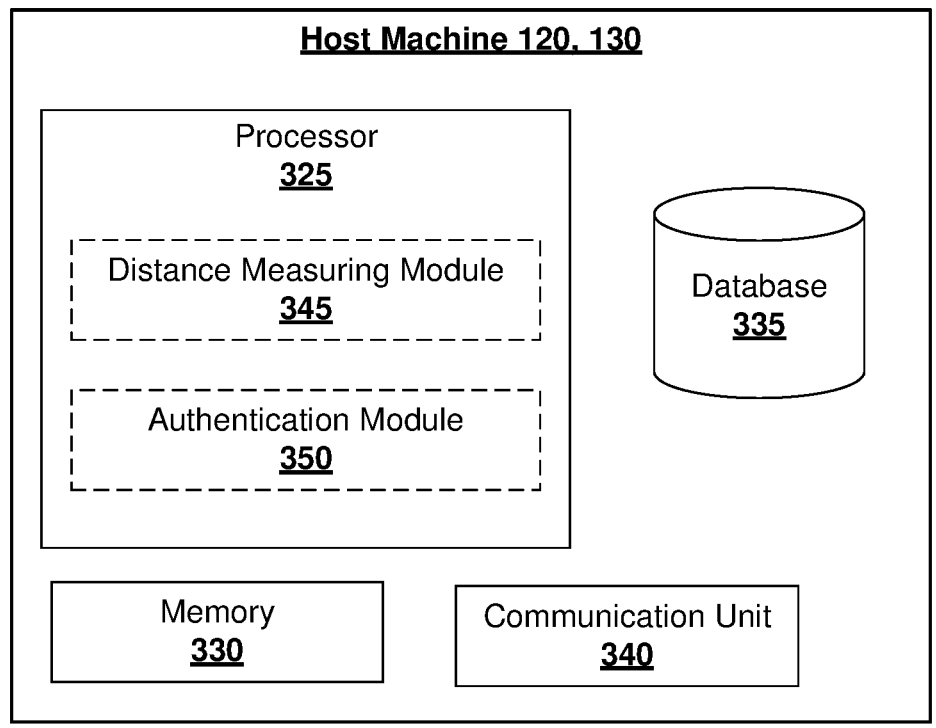
FIG. 3B shows a high level block diagram of an exemplary host machine.

FIG. 3B shows a high level block diagram of an exemplary host machine 120, 130. The host machine 120, 130 may include a processor 325 in association with a memory 330. The host machine 120, 130 may further include a database 335 storing network resources, user credentials, and so forth. The host machine 120, 130 may further include a communication unit 340 for sending and receiving data (e.g., via a wireless network).

The memory 330 may store instructions which can be implemented by the processor 325. Some instructions may be used in various dedicated modules (e.g., virtual software modules, modules combining software and hardware units, or modules combining firmware and dedicated logic units). In particular, there may be provided a distance measuring module 345 for measuring RTTs and distances between the host machine 120, 130 and the client device 110. There may also be provided an authentication module 350 configured to run authentication process as described herein and make authentication decisions in response to user authentication requests received from the client device 110.

As mentioned, the communication between the client device 110 and the host machine 120, 130 may be performed via a communications network (not shown). The communications network, generally speaking, can be a wireless or wire network, or a combination thereof. For example, the network may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

Figure 4:
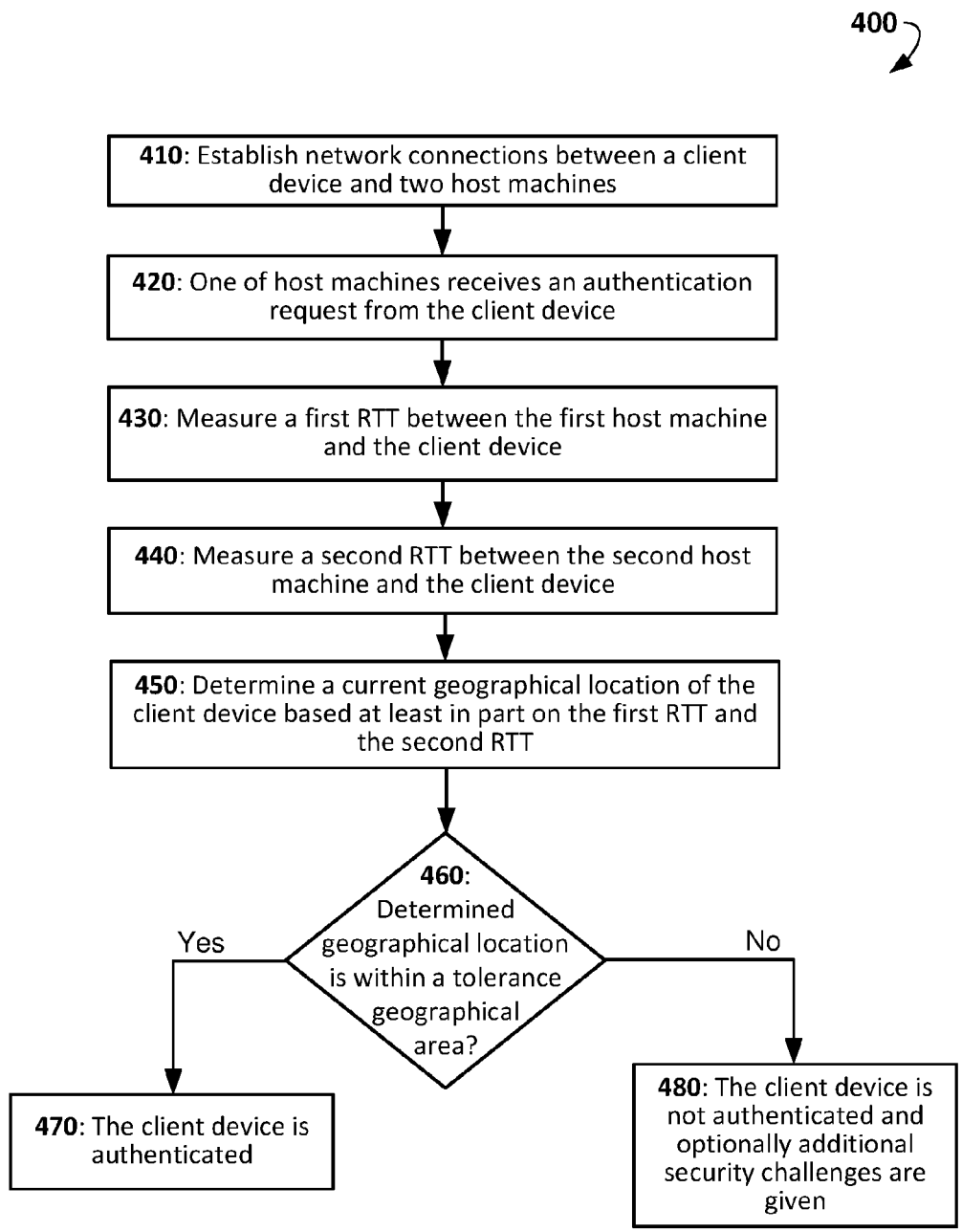
FIG. 4 is a process flow diagram showing a method for user authentication according to an example embodiment.

FIG. 4 is a process flow diagram showing a method 400 for user authentication according to an example embodiment. The method 400 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the host machine 120, 130. In other words, the method 400 can be performed by various components discussed above with reference to FIGS. 3A and 3B.

The method 400 may commence at operation 410 with the client device 110 establishing network connections between the client device 110 and the first host machine 120 and between the client device 110 and a second host machine 130. At operation 420, one of the host machines 120, 130 may receive, from the client device 110, an authentication request (which may include user credentials and/or request to access network resources or online services).

At operation 430, the distance measuring module of the first host machine 120 may measure a first RTT between the first host machine 120 and the client device 110. At operation 440, the distance measuring module of the second host machine 130 may measure a second RTT between the second host machine 130 and the client device 110.

At operation 450, one of the host machines 120, 130 (or optionally a third party device) determines a current geographical location of the client device 110 based at least in part on the first RTT and the second RTT.

At operation 460, it may be determined whether the geographical location of the client device 110 is within the tolerance geographical area 140. If it is determined that the geographical location of the client device 110 is within the tolerance geographical area 140, at operation 470, the client device 110 is successfully authenticated. Otherwise, at operation 480, the client device 110 is not authenticated and, optionally, additional security challenges are provided to the user.

Figure 5:
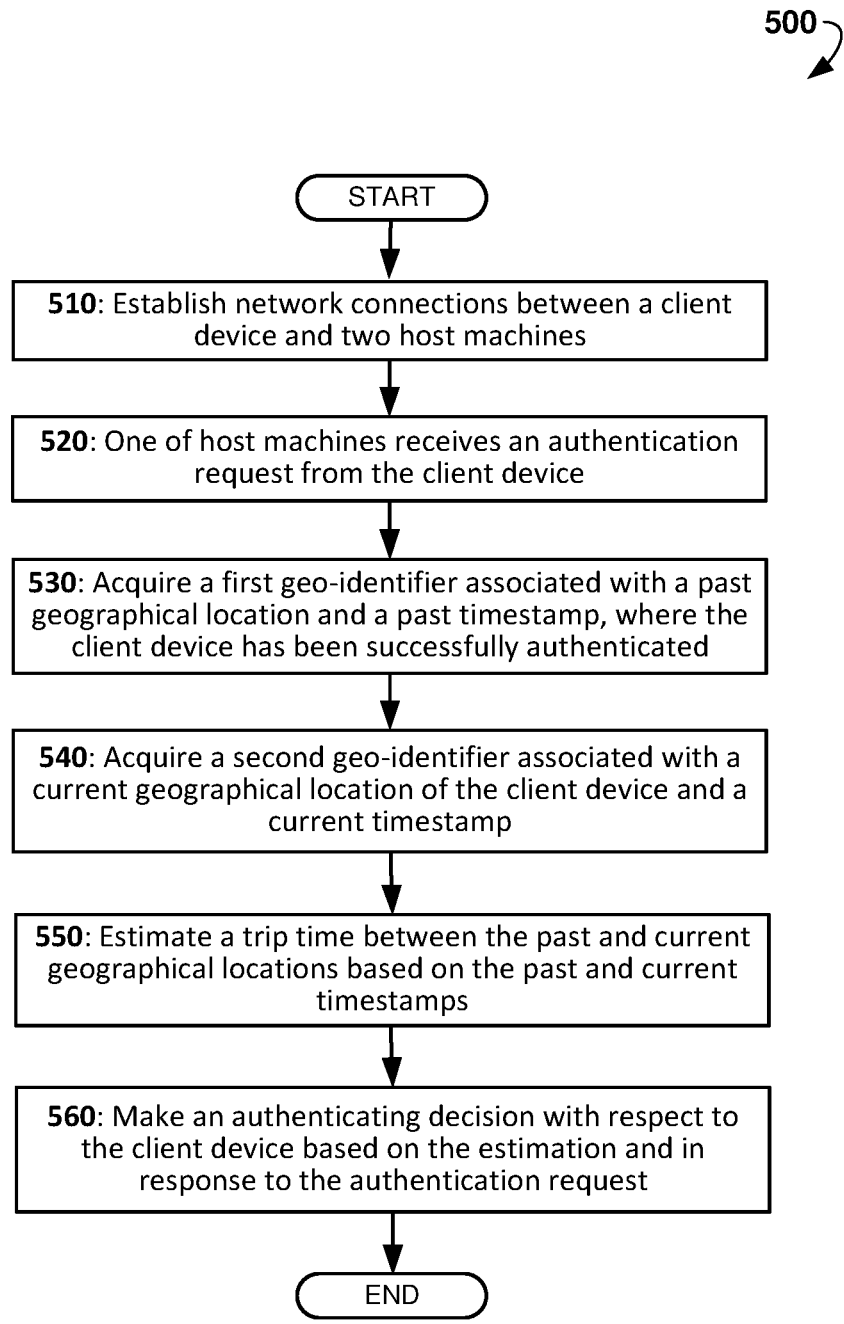
FIG. 5 is a process flow diagram showing a method for user authentication according to another example embodiment.

FIG. 5 is a process flow diagram showing a method 500 for user authentication according to another example embodiment. The method 500 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the host machine 120, 130. In other words, the method 500 can be performed by various components discussed above with reference to FIGS. 3A and 3B.

The method 500 may commence at operation 510 with the client device 110 establishing network connections between the client device 110 and at least two host machines 120, 130. At operation 520, one of the host machines 120, 130 receives an authentication request from the client device 110.

At operation 530, at least one of the host machines 120, 130 acquires a first geo-identifier of the client device 110, which first geo-identifier is associated with a past geographical location C1 and a past timestamp, where the client device 110 has been successfully authenticated.

At operation 540, at least one of the host machines 120, 130 acquires a second geo-identifier of the client device 110. The second geo-identifier is associated with a current geographical location C2 of the client device 110 and a current timestamp.

At operation 550, at least one of the host machines 120, 130 estimates a trip time between the past geographical location C1 and the current geographical location C2 based at least in part on the past timestamp and the current timestamp and, optionally, based on the distance between locations C1 and C2.

At operation 560, at least one of the host machines 120, 130 makes an authenticating decision with respect to the client device 110 based at least in part on the estimation and in response to the authentication request. Specifically, when it is determined that the estimated trip time is less than a difference between the timestamps, the client device 110 may be authenticated. Otherwise, when it is determined that the estimated trip time is more than the difference between the timestamps, the client device 110 may not be authenticated.

Figure 6:
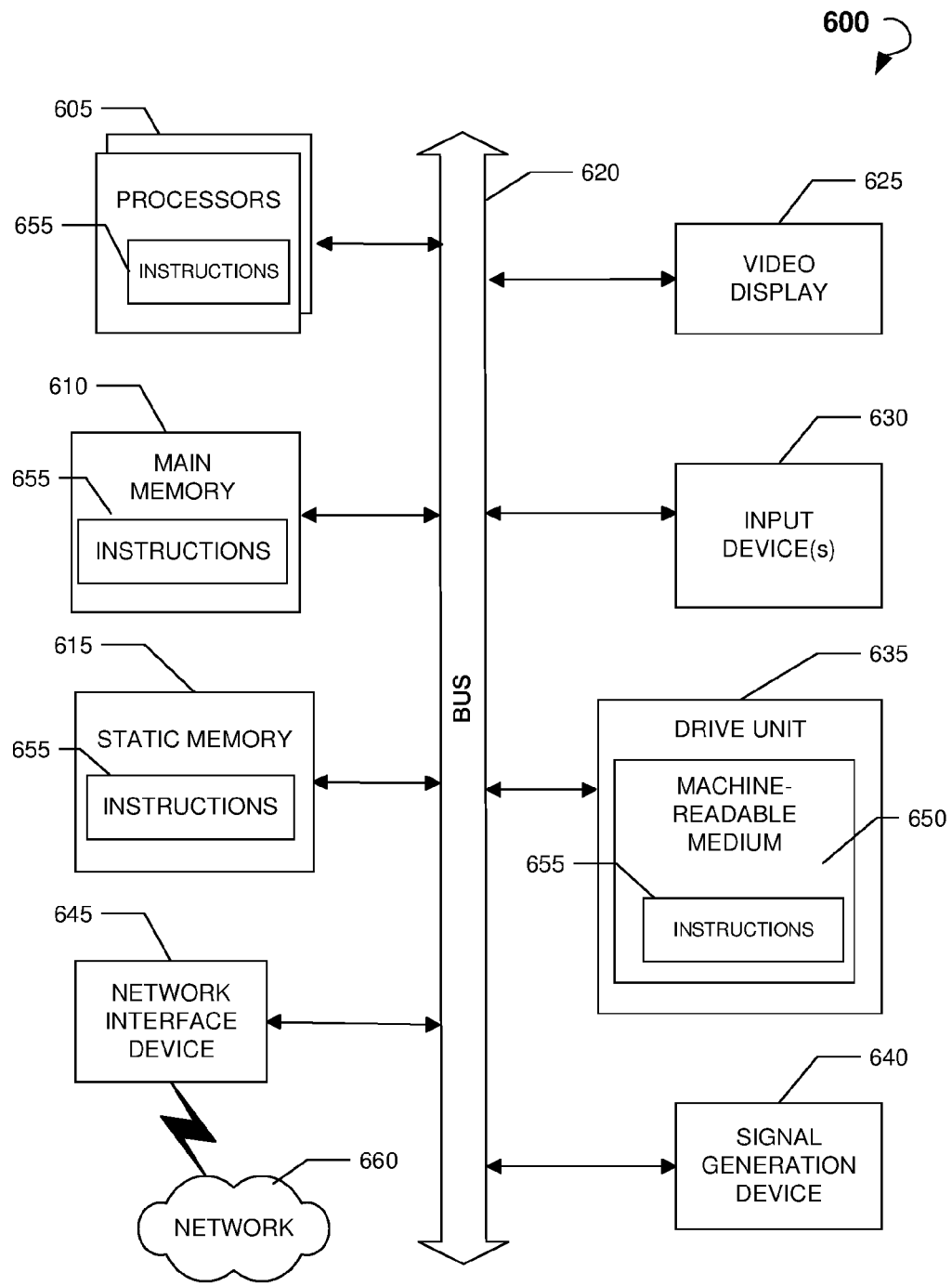
FIG. 6 shows a diagrammatic representation of a computing device for a machine in the example electronic form of a computer system, within which a set of instructions for causing the machine to perform any one or more of the methodologies discussed herein can be executed.

FIG. 6 shows a diagrammatic representation of a computing device for a machine in the example electronic form of a computer system 600, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), gaming pad, portable gaming console, in-vehicle computer, infotainment system, smart-home computer, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., a liquid crystal display (LCD) or a cathode ray tube (CRT)). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The disk drive unit 635 includes a computer-readable medium 650, which stores one or more sets of instructions and data structures (e.g., instructions 655) embodying or utilized by any one or more of the methodologies or functions described herein. The instructions 655 can also reside, completely or at least partially, within the main memory 610 and/or within the processors 605 during execution thereof by the computer system 600. The main memory 610 and the processors 605 also constitute machine-readable media.

The instructions 655 can further be transmitted or received over the network 660 via the network interface device 645 utilizing any one of a number of well-known transfer protocols (e.g., Hyper Text Transfer Protocol (HTTP), CAN, Serial, and Modbus).

While the computer-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for user authentication involving determining current geographical location of client device are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for user authentication, the method comprising:

receiving, by at least one processor, an authentication request from a client device;

acquiring, by the at least one processor, at least one HTTP (Hypertext Transfer Protocol) cookie from the client device, wherein the HTTP cookie includes metadata associated with a current geographical location, the current geographical location corresponding to a point;

acquiring, by the at least one processor, at least one HTTP cookie from the client device, wherein the HTTP cookie includes metadata associated with a trusted tolerance geographical area;

determining, by the at least one processor, whether the current geographical location of the client device is within the trusted tolerance geographical area, the trusted tolerance geographical area being circumscribed by a plurality of points, the plurality of points being varying respective distances from a host machine; and in response to the authentication request, authenticating the client device, by the at least one processor, based at least in part on a determination that the current geographical location of the client device is within the trusted tolerance geographical area.

2. The method of claim 1, wherein the authentication request includes a request to access networked data or services.

3. The method of claim 1, wherein the authentication request includes user credentials and wherein the authentication of the client device includes verifying a user identity based on the user credentials.

4. The method of claim 1, wherein the trusted tolerance geographical area is defined based at least in part on historical data of past geographical locations where the client device has been successfully authenticated.

5. The method of claim 4, wherein the determining, by the at least one processor, whether the current geographical location of the client device is within the trusted tolerance geographical area comprises calculating at least one of a distance between the current geographical location of the client device and a past geographical location.

6. The method of claim 1, wherein the metadata comprises at least one geographical location based on a network.

7. The method of claim 1, wherein the metadata comprises at least one geographical location based on at least one mobile address.

8. The method of claim 7, wherein the at least one mobile address comprises Internet Protocol version 4 (IPv4) and Internet Protocol version 6 (IPv6) addresses.

9. The method of claim 1, wherein the metadata comprises at least one geographical location based on absolute coordinates.

10. The method of claim 1, further comprising:
in response to HTTP cookies including metadata associated with the trusted tolerance geographical area being absent or including misleading metadata, requesting, by the at least one processor, authentication of the client device based on user credentials.

11. The method of claim 10, wherein user credentials comprise a user login and password.

12. The method of claim 11, wherein in response to the user login and password not being successfully authenticated, further requesting, by the at least one processor, an answer to a security question.

13. The method of claim 1, wherein the metadata associated with the trusted geographical area is dynamically updated at least in part each time the client device is successfully authenticated.

14. The method of claim 1, wherein based on a determination that the current geographical location of the client device is not within the tolerance geographical area, the client device is not authenticated.

* * * * *